Aug. 8, 1961  S. TORKOWSKI  2,995,283
TIRE MOUNT
Filed Aug. 25, 1958
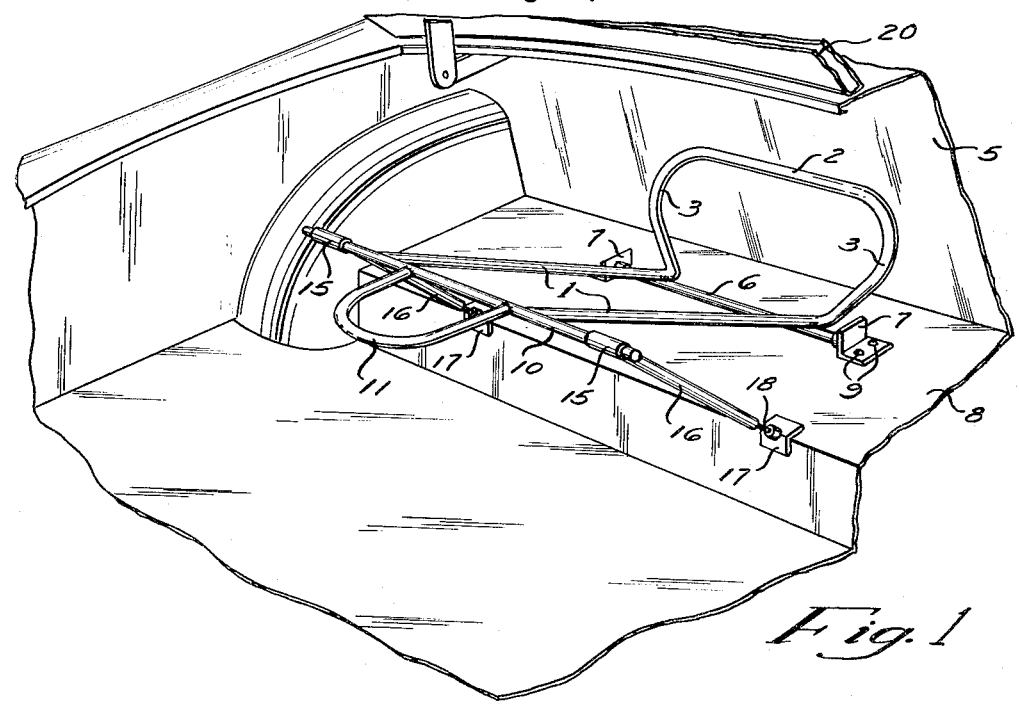
Fig. 1
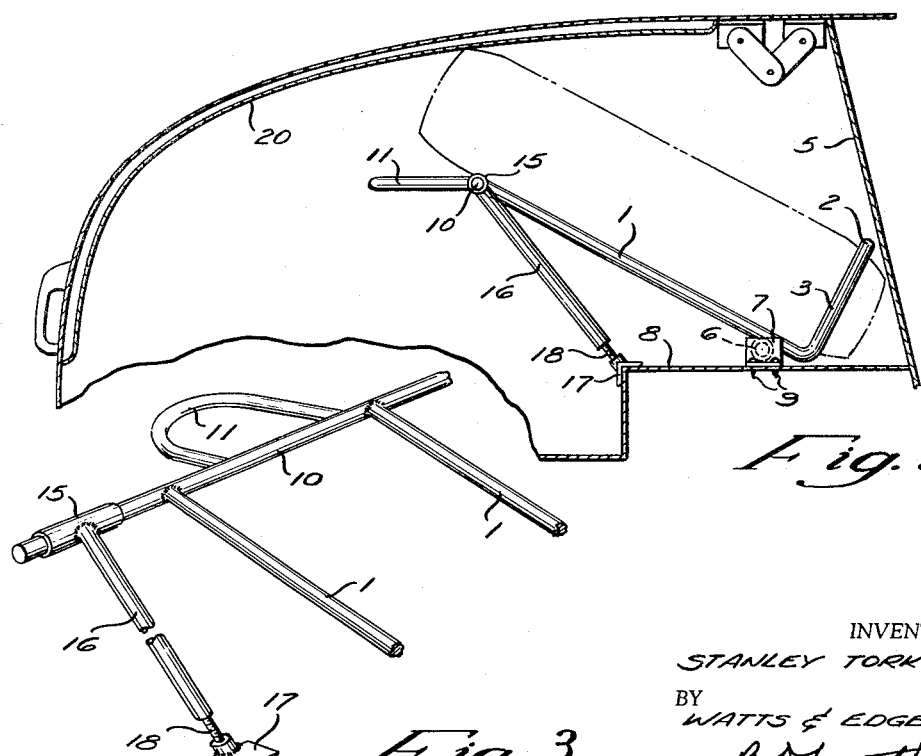
Fig. 2
Fig. 3
INVENTOR.
STANLEY TORKOWSKI
BY
WATTS & EDGERTON
A.D. Watts
ATTORNEYS

United States Patent Office 2,995,283
Patented Aug. 8, 1961

2,995,283
TIRE MOUNT
Stanley Torkowski, 814 E. 155th St.,
Cleveland 10, Ohio
Filed Aug. 25, 1958, Ser. No. 756,778
1 Claim. (Cl. 224—42.13)

This invention relates generally to the art of carrying spare tires or wheels and is particularly concerned with a tire carrier which may be housed in the trunk compartment of an auto body and which is so disposed that the tire carried on it may be positioned in part by engagement with the lid of the trunk compartment.

At present, many automobiles carry a spare tire disposed partly in a well in the floor of the trunk compartment. The well utilizes space which could well serve for baggage and, when the tire is in the well, it is spaced some distance in from the side of the trunk compartment thereby making the space between the tire and the side of the trunk compartment useless except for carrying small articles.

The present invention aims to overcome the foregoing and other disadvantages of the above-described system of carrying spare tires or wheels, and attains this object by means of a new combination of elements and a new arrangement of those elements in the trunk compartment of an automobile body.

The present invention will be better understood by those skilled in the art from the following specification and the drawings accompanying it in which:

FIGURE 1 is a fragmentary perspective view of apparatus embodying the present invention;

FIGURE 2 is a longitudinal cross-sectional view showing the tire carrier of FIGURE 1 in side elevation and with the tire in position relative to said carrier and to the lid of the trunk compartment, and FIGURE 3 is a fragmentary perspective view of the tire carrier of FIGURES 1 and 2.

The illustrated tire carrier comprises a U-shaped frame consisting of legs 1 connected by an upturned end 2 which has curved portions 3 spaced apart far enough from one another to receive a portion of a tire therebetween and shaped to conform to the contour of the tire in contact therewith. As is better shown in FIGURE 2, the upturned end 2 is positioned close to the wall 5 which constitutes the forward end of the trunk compartment. The U-shaped frame consisting of parts 1 and 2 is fixed as by welding, brazing or the like, to tube 6 which is rotatably mounted in brackets 7, these brackets being secured to the top of shelf 8 of the compartment by any suitable means, for example, screws or bolts 9.

At their free ends, legs 1 are secured in any suitable manner but preferably by welding or brazing to front member 10 which is provided with a rearwardly extending handle 11. As is better shown in FIGURE 2, the handle 11 is preferably substantially horizontal when the U-shaped frame is in tire-carrying position.

On each end of the front member 10 is rotatably mounted a sleeve 15 to which is attached an arm 16. Feet in the form of angles 17 shaped to engage the rear edge of shelf 8 of the riser carry threaded stems 18 which have screw-threaded engagement with the lower ends of arms 16.

The tire or wheel carrier just described may be readily mounted in the trunk compartment of an automobile by placing the U- shaped member with the upper part or end 2 closely adjacent to, for example a small fraction of an inch from, the rear side of front wall 5 of the compartment and securing brackets 7 to the shelf 8 of the trunk compartment as by screws 9. Then a tire or wheel to be carried is placed on the frame and the handle 11 is lifted and the frame is pivoted in brackets 7 until the tire is in position to be lightly engaged by the inside of the lid 20 of the trunk compartment. Then the stems 18 are adjusted in arms 16 so that when the angles 17 are in place on the rear edge of shelf 8 the tire will engage the inner side of the trunk lid when closed.

It will be understood from the foregoing description that the tire carrier is secured to the automobile only by fasteners 9 and that the tire or wheel is not securely fastened to the carrier but is maintained in position on parts 2 and 3 of the frame by engagement with the trunk lid. Thus, the tire or wheel is secured in position on the carrier without the aid of straps, bolts and the like, and simply by means of the cooperation of the trunk lid and the carrier. The tire or wheel may be readily removed from the carrier simply by pulling it rearwardly off the carrier when the trunk lid is raised.

It will be understood that while the parts 1, 2, 3, 6, 10, 11 and 16 are shown or described as being made of tubing, some or all of these parts may be made of rods. For example, rods may be used quite effectively in making parts 6 and 10.

It will also be seen that when a carrier embodying my invention is employed, the trunk compartment need not have a well formed in its floor for the spare tire or wheel and that the floor of the compartment for its entire width is available for use in placing baggage thereon. Furthermore, the arms 16 occupy but little space and are separate laterally far enough for bags of various sizes to be placed between them. As a result, the baggage carrying space within the compartment may be utilized to the best advantage, both because of the location of the tire or wheel above the shelf, and the minimum amount of interference afforded by the arms 16 to the placing of baggage in the compartment.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

In a vehicle trunk having a lid and a bottom wall including a shelf at its forward end, the provision of a tire rack, said rack comprising a frame including forwardly and downwardly inclined legs to support the side of a tire and having an upturned forward end to receive the tread of the tire, said frame being pivotally connected near its forward end to the top of the shelf, a member connecting the free rear ends of said legs, and adjustable means including first and second end portions for adjustably positioning said rack about its pivotal connection and relative to said trunk lid, one of said end portions being pivotally connected to said member, and the other of said end portions being engageable with the said bottom wall of the trunk rearwardly of the said pivotal connection of the frame to the shelf, the end portions of said means being adjustable toward and away from each other to adjust the frame with the tire thereon so that the tire will contact the underside of a trunk lid when closed.

References Cited in the file of this patent

UNITED STATES PATENTS

| | | |
|---|---|---|
| 2,063,598 | Franklin | Dec. 8, 1936 |
| 2,115,779 | Lyon | May 3, 1938 |
| 2,146,106 | Biszantz | Feb. 7, 1939 |
| 2,175,769 | Biszantz | Oct. 10, 1939 |
| 2,188,548 | Biszantz | Jan. 30, 1940 |
| 2,214,937 | Ragsdale | Sept. 17, 1940 |
| 2,320,856 | Ehlers | June 1, 1943 |
| 2,568,628 | Herring | Sept. 18, 1951 |
| 2,647,012 | Walker | July 28, 1953 |
| 2,806,616 | Fisher et al. | Sept. 17, 1957 |